United States Patent
Siano

(10) Patent No.: US 6,475,413 B1
(45) Date of Patent: Nov. 5, 2002

(54) PROCESS AND DEVICE FOR CO-INJECTION MOLDING MULTILAYER PRODUCTS

(75) Inventor: Dante Siano, Cologno Monzese (IT)

(73) Assignee: Johnson Control S.p.A., Lomagna (IT)

( * ) Notice: Subject to any disclaimer, the term of this patent is extended or adjusted under 35 U.S.C. 154(b) by 0 days.

(21) Appl. No.: 09/647,785

(22) PCT Filed: Apr. 6, 1999

(86) PCT No.: PCT/EP99/02329

§ 371 (c)(1),
(2), (4) Date: Oct. 5, 2000

(87) PCT Pub. No.: WO99/51416

PCT Pub. Date: Oct. 14, 1999

(30) Foreign Application Priority Data

Apr. 7, 1998 (EP) .............................. 98830210

(51) Int. Cl.$^7$ .............................. B29C 45/16; B32B 9/04
(52) U.S. Cl. ................ 264/40.1; 264/328.7; 264/328.8; 425/130; 428/411.1; 428/500
(58) Field of Search .............................. 264/40.1, 328.7, 264/328.8; 425/130; 428/411.1, 500

(56) References Cited

U.S. PATENT DOCUMENTS

| | | | |
|---|---|---|---|
| 3,873,656 A | | 3/1975 | Garner |
| 4,275,030 A | * | 6/1981 | Mares ........................ 264/250 |
| 4,385,025 A | * | 5/1983 | Salerno et al. .............. 264/255 |
| 5,046,942 A | | 9/1991 | Gellert |
| 5,356,576 A | * | 10/1994 | Fischbach .................. 264/40.4 |
| 5,759,479 A | * | 6/1998 | Gotterbauer ................ 264/572 |
| 5,788,906 A | * | 8/1998 | Morita ........................ 264/245 |
| 5,799,385 A | * | 9/1998 | Vecchiarino et al. .......... 29/469 |
| 6,030,573 A | * | 2/2000 | Matsumoto et al. ........ 264/511 |

FOREIGN PATENT DOCUMENTS

| | | |
|---|---|---|
| DE | 3711079 | 10/1988 |
| EP | 0688652 | 12/1995 |
| EP | 0704290 | 4/1996 |
| GB | 1339444 | 12/1973 |
| GB | 1339445 | 12/1973 |
| JP | 02206518 | 8/1990 |
| JP | 06312437 | 11/1994 |
| JP | 08174603 | 7/1996 |

OTHER PUBLICATIONS

Patent Abstracts of Japan vol.95 No. 8 &JP 07117081 May 9, 1995.

* cited by examiner

Primary Examiner—Suzanne E. McDowell
(74) Attorney, Agent, or Firm—Millen, White, Zelano & Branigan, P.C.

(57) ABSTRACT

Multilayer products, such as vehicle trim panels, provided with an external skin layer and an internal core layer are co-injection molded by injecting external material (P) through a first plurality of points of injection (3a–3c) and injecting the core material (C) through a second plurality of points of injection (4a–4g), the points and nozzles of injection of one material being physically distinct from those of the other material.

11 Claims, 3 Drawing Sheets

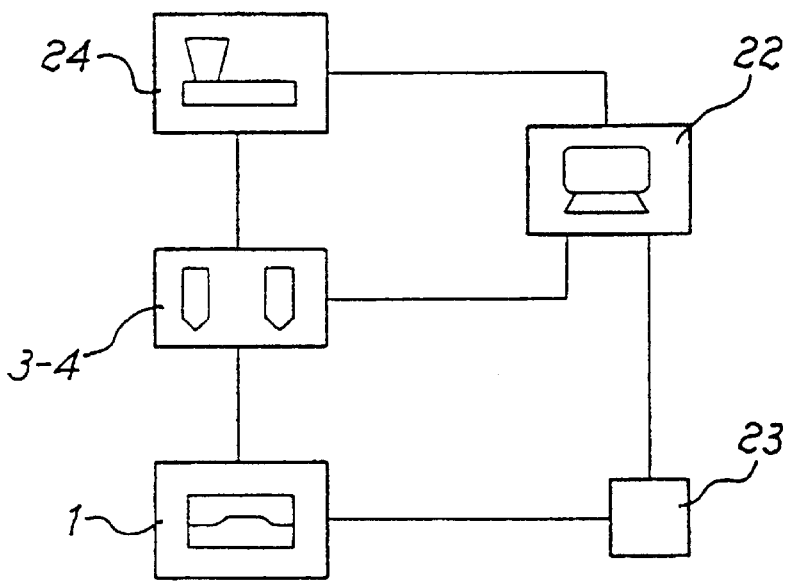
_Fig.4_
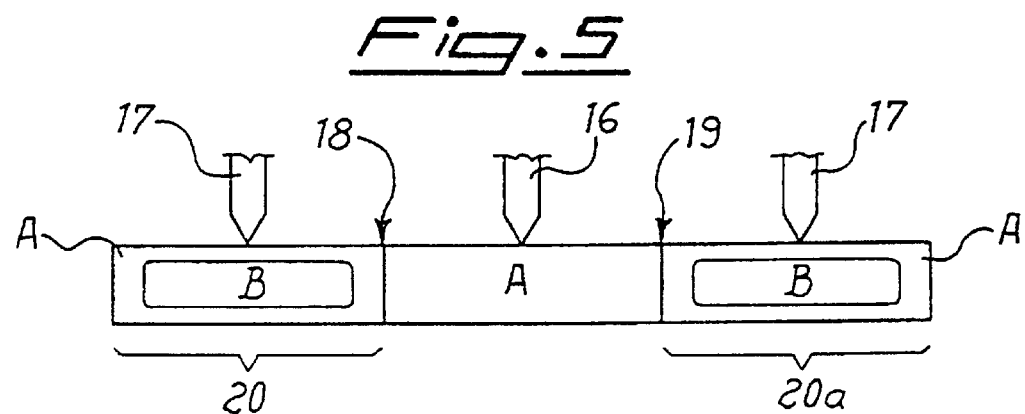
_Fig.5_
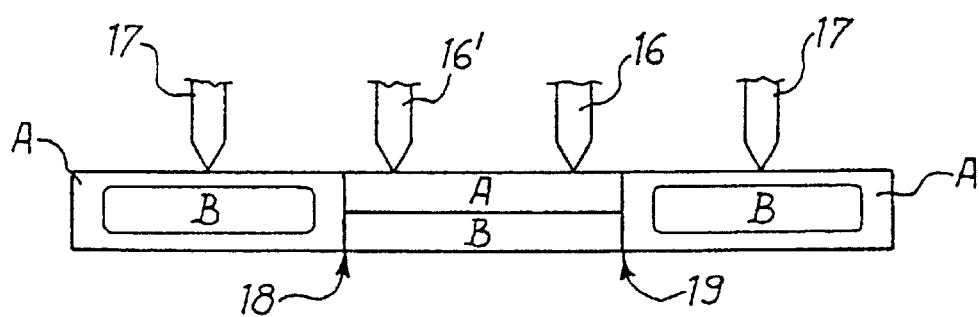
_Fig.6_

PROCESS AND DEVICE FOR CO-INJECTION MOLDING MULTILAYER PRODUCTS

TECHNICAL FIELD

The present invention relates to a process and a device for co-injection molding multi-layer elements and to the products thus obtained.

In particular, the invention relates to the production of elements provided with at least one part having an external skin which covers an internal core material. Examples of such product are trim panels and trim elements of motor vehicles.

BACKGROUND ART

To obtain products of a type similar to those described above co-injection processes are already known which provide for the sequential injection of two or more materials from a single injector nozzle. In these processes a preset amount of skin material is initially injected into the mould, followed by one injection of core material and then another injection of skin material.

The European Patent No.0579925, in the name of the applicant, describes a device for co-injection molding provided with independently heated hot channels and nozzles located in the wall of the mould. The nozzles described may be either coaxial or side-by-side and they allow two or more materials to be injected successively into the same mould cavity from a plurality of points. PCT application No.WO 95/17291, in the name of the applicant, describes a process for co-injection of products with complex shapes. According to this process, the thickness of the mould is controlled according to the rheological properties of the material to be injected in order to obtain flow paths having substantially the same resistance and thus achieve homogenous distribution of the material inside the mould. The materials are injected via nozzles of the type for sequential injection of two materials; in the preferred embodiment only one nozzle is used for a mould for a car panel.

These processes allow products with complex shapes, such as car panels with integral compartments, handles and grilles for loudspeakers, to be produced with a uniform external skin and an internal structural core. However, these processes require high injection pressures, which in turn mean large presses, flash on the molding, materials that are particularly fluid, or a greater thickness of moulds, with their related costs.

SUMMARY OF THE INVENTION

It is an aim of the invention to solve the aforementioned problems and to provide a simple and economical process for co-injection molding of two or more materials to give products having at least in part an external skin and an internal core.

A further aim of the invention is to provide a device to carry out the above described process.

Such aims are achieved by the present invention which relates to a process for co-injection molding of multi-layer products using of two or more materials, comprising a plurality of nozzles located in a corresponding plurality of distinct points on the same cavity of a mold characterized by at least one of the said nozzles being provided with means of feeding only one of the said materials. According to the preferred aspect of the invention, only one material is injected at each point of the injection and the materials are preferably cascade injected.

The invention further relates to a device for co-injection molding multi-layer products as set forth above.

A further object of the invention are the multi-layer products obtained by the process of the invention, which comprise at least one portion provided wit one external skin layer and one or more internal core layers The process is characterized by having a plurality of points of injection, at least one of the said points being dedicated to only one of the said materials.

The invention has several advantages over known processes. Lower injection pressures are required, therefore smaller and less expensive presses can be used. Also, the molding-cycle time is shorter than in prior art. Furthermore, junction lines between the flows of materials are avoided and the mould can have substantially constant thickness for the greater part of its extent, if this does not conflict with the design requirements. The constant thickness results in greater facility of design and less weight in the finished product.

Another advantage lies in being able to produce the fixing elements to assemble the panels onto the doors and the counter-panels or complementary panels (retainers and studs) out of core material alone, i.e. with a rigid material. Thus, very soft materials can be chosen for the skin layer, improving the 'feel' of the finished product.

BRIEF DESCRIPTION OF THE DRAWINGS

The invention will now be described in more detail with reference to the attached drawings, which are by way of example and not limiting the scope of the patent and in which:

FIG. 4 is a block diagram of an embodiment according to the invention;

FIGS. 5 and 6 are schematic views of other products which can be obtained with the process according to the invention.

BEST MODE OF CARRYING OUT THE INVENTION

The present invention provides for a multi-point co-injection process of two or more materials in the same mould cavity, in which only one material is injected from at least one of the injection points, i.e. the feeding to that point is dedicated to a single material and there are no other materials delivered to that point. In other words, at least one of the points (and one of the nozzles) for the injection of the first material is different and physically distinct from all the injection points of a second material (or of any further other material). This differs from the known art, which provides to have injection points where two (or more) materials are fed, possibly successively, using one nozzle for two materials that are injected through the same hole of the nozzle or from two side-by-side holes on the same noble (or injector). An "injection point" substantially corresponds to the mould area where the injection nozzle is located.

In the device according to the invention, there is an injection nozzle dedicated to only one material in at least one of the injection points. As a result, the dedicated nozzle is connected to a means of feeding only one material and has single-material feeding lines. Preferably, all the nobles are of the dedicated type: which means that all the nozzles for the first material are different from all the nozzles of the second material (and, in case, all said points of injection are different from those of further materials).

Figure 1:
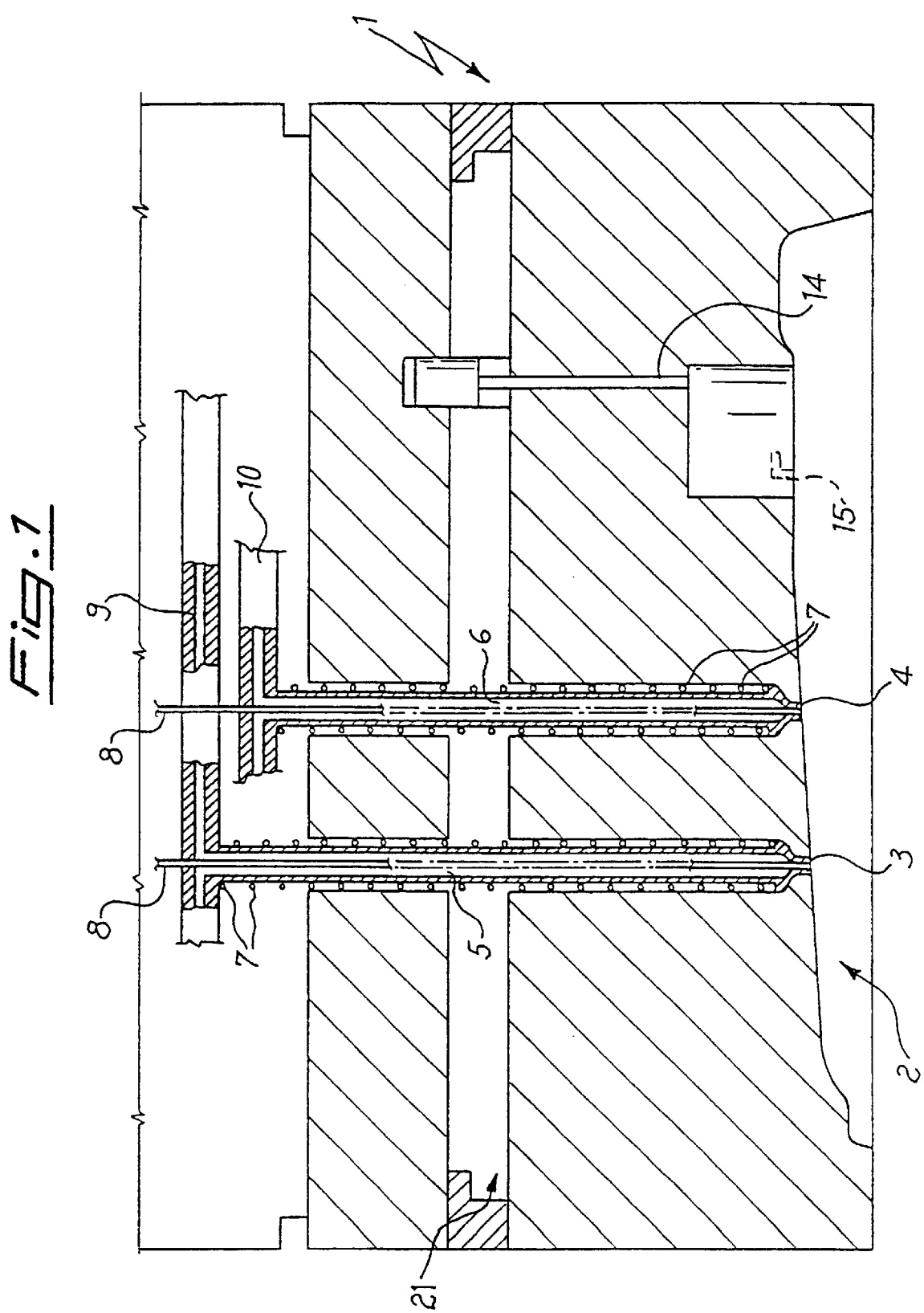
FIG. 1 is a schematic sectional view of a device according to the invention.

FIG. 1 shows the upper part of a mould 1, provided with a cavity 2 and two injection nozzles 3 and 4, which extend into the upper part of mould 1. Nozzles 3 and 4 have feeding channels 5 and 6 which can be heated by heating means 7. Means 7 are known per se in the art. Nozzles 3 and 4 have rods 8 to control the feeding of the material into mold cavity 2. Rods 8 move axially in a way known per se in the art, e.g. by oleodynamic piston, from a partially withdrawn position for injecting material to a "nozzle closed" position where the tip of the rod is substantially aligned with the nozzle opening level. In FIG. 1 nozzles 3 and 4 are both shown with rods lowered in the 'nozzle closed' position. The rods 8 are only partially shown for a batter clarity of the drawing.

Both nozzle 3 and nozzle 4 are dedicated; i.e. they can inject only one type of material: in fact channels 5 and 6 are connected respectively to distributors 9 and 10, which receive their respective material from two injection units on the same press (not shown). Generally, distributors 9 and 10, too, are equipped with means of heating. The space 21 in the upper part of mold 1 is for an extraction plate (not shown) that operates in a known way the knockouts for the molded piece.

The nozzles 3 and 4 may be located on the closing face of the mold immediately next to the mold cavity. In another embodiment, the nobles are located in the mold cavity on the portion of the mold corresponding to the side of the molded piece which will not be visible when the product is in use; e.g. in the case of vehicle interior panels the nozzle side would be that which faces the bodywork on the assembled product. The latter nozzle arrangement is particularly useful inasmuch as it allows the injection pressure to be reduced. Furthermore, this arrangement is useful when the product is not to be painted or covered, because there are different materials around nozzles 3 and 4 in the finished product. In fact, the skin material is injected by nozzle 3 and the core material by nozzle 4, the surface of the panel will thus have a discontinuity in the skin around 4.

Figure 2:
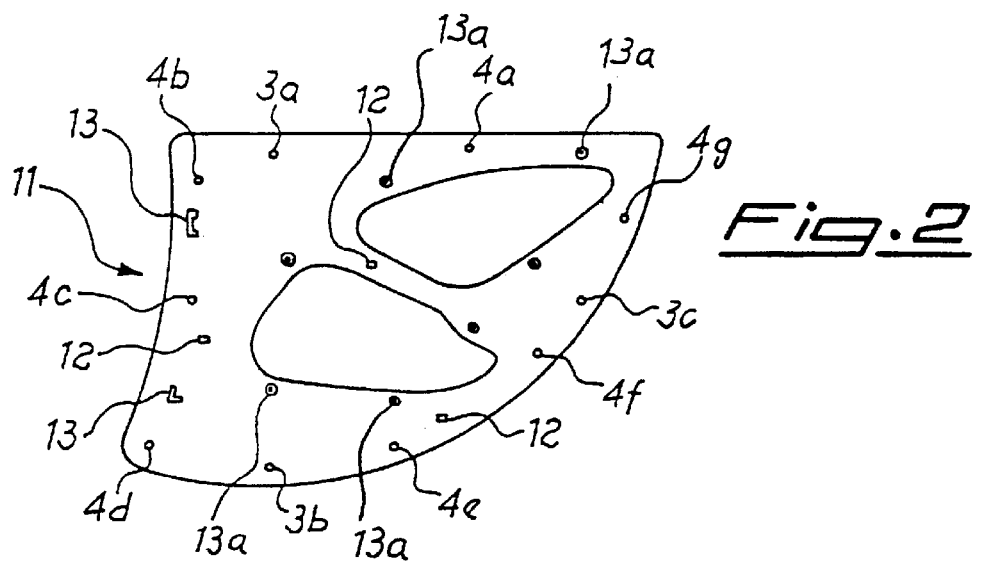
FIG. 2 is a schematic plan view of the back of a vehicle interior panel on which are shown the injection points.

The nozzles for the injection of the two materials are located relatively close to each other to give co-injection of the two materials. Preferably there is a first plurality of nozzles (at least two nozzles) dedicated to the first material and a second plurality (two or more nozzles) dedicated to the second material (and so on for other further materials if any): FIG. 2 shows the reciprocal position of two groups of nozzles for the co-injection of a vehicle trim panel 11. As shown, panel 11 is comprising a handle integral with the rest of the panel body and has a particularly complex shape. The injection points for the two materials of skin and core are shown with reference numbers 3a–3c for the skin nozzle and 4a–4g for the core nozzles. Reference numbers 12 identify gas injection points to inject gas during the molding of the panel. The gas is injected to create some "hollow" sectors to make the panel lighter and to avoid any draw after the molding. The injection of gas during injection molding is a known technique for the skilled person.

The location of each of the various nozzles is calculated bearing in mind the thickness and geometry of the mold cavity and the rheology of the materials injected. In particular, the distance between a skin noble and a core nozzle should be such as to prevent excessive cooling of the skin material already injected at the center of the section of the product. In particular, the distance between two adjacent nozzles for skin and core must be such as to allow the skin material to reach and extend beyond the core injection point in a sufficiently fluid state so that it can be driven and distributed in the mold by the core material when it is injected.

According to a preferred embodiment there are more core nozzles than skin nozzles.

Means of heating one or more parts of the mold can also be provided to facilitate the flow of the materials throughout the cavity.

The 'retainers' and 'studs' which allow the panel to be mounted on the door are shown as 13 and 13a respectively. Substantially, the retainers are brackets and the studs are pivots which project from the panel in prefixed positions. These brackets or retainers can be molded as a single piece with the panel by means of a slide valve mechanism actuated by a jack 14 (FIG. 1) which closes a part of the mould related to retainers or studs during the injection of the skin material.

Figure 3A:
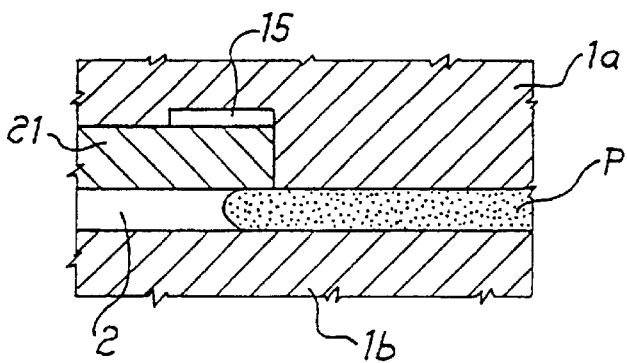
FIGS. 3a–3c are enlarged schematic views of a detail of the device of FIG. 1 during the molding steps.
Figure 3B:
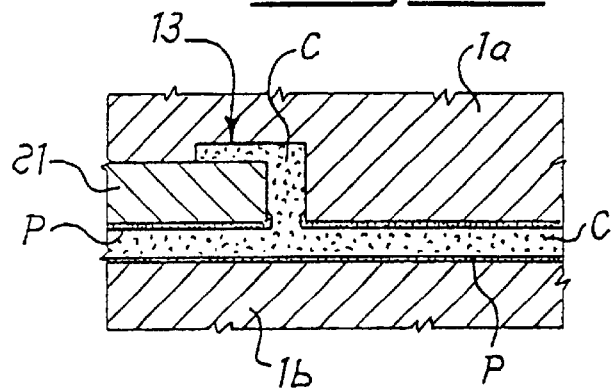
Figure 3C:
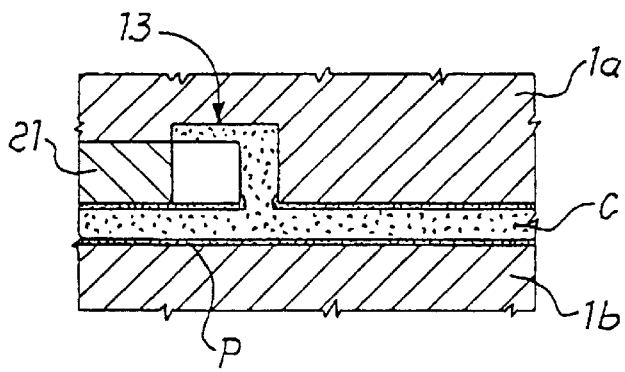

FIGS. 3a–3c show the operation of the mechanism during molding to form a retainer. The mechanism comprises a slide valve 21 which is moved by jack 14 (FIG. 1) in a way known in the art, to close at will the portion of the mould corresponding to retainer 13 and to isolate it from mold cavity 2. The upper and lower parts of the mold 1 are referred to as 1a and 1b respectively. According to the invention, the slide valve is closed during the injection of the skin material, preventing material P from entering into cavity 15. The second step of the process (FIG. 3b) provides for the opening of the slide valve to allow cavity 15 to fill up with core material C. The slide valve is brought to the FIG. 3b position when the material C reaches the area of cavity 15. The last step is shown in FIG. 3c and occurs when molding has been completed. This step entails the further withdrawal of the slide valve to clear the overhang of the retainer and allow the panel to be removed from the mold.

In the case of the stud, the slide valve also has the function of expelling the stud to facilitate the removal of the panel from the mold.

An oleodynamic system directly connected to the press is used to control the operation of the various nozzles. FIG. 4 shows a schematic embodiment to implement the process of the invention. In this embodiment there is provided an electronic processing means 22 (e.g. a plc unit) to control the operation of nozzles 3 and 4. Means 22 is connected with sensors 23 or other means of detecting the advance of the material front in mold 1 and sending a correspondent signal when the material has reached a pre-selected point. These sensors are preferably transducers. The unit 22 is also connected to press 24 to detect the height of the screws, and to nozzles 3 and 4 to trigger their operation when required.

The process according to the invention operates in the following manner.

Initially, a predetermined amount of skin material is injected through injection nobles 3a–3c. The amount of material injected is substantially that required for the skin on the molded product and it extends inside the mold until it reaches and covers the areas where the nozzles for injecting the core material 4a–4g are located. Then the core material is injected through core nobles 4a–4g. The skin material is pushed and distributed around the mould by the core material injected through its related nozzles 4a–4g, which, as shown, are more than the skin nozzles.

Preferably, at least the skin nozzles are operated in cascade according to a timing controlled by the travel height of the screws in the injection press; in this way the junction lines between different flows arriving from different nozzles are more easily avoided because the flow from each nozzle merges into the initial flow once that flow passes the noble position. This means that noble 3b is not activated until the skin material flow P from nozzle 3a has already reached—and preferably passed—nozzle 3b, and so on for all the nozzles.

According to an embodiment of the invention there is a short overlapping time between the operation of one nozzle and operation of the next; e.g. nozzle 3a operates from screw height 150 to height 98; 3b from height 100 to height 58; 3c from height 60 to height 10 (end of travel height). Nozzles 4a–4g are operated in a similar way and as a function of the reciprocal position i.e. out of (e.g.) seven nozzles there can be two branching "sequences". In this case, unlike what was said above for the method which provides for first all the skin nozzles and then all the core nozzles to be operated, some core nobles are operated before some of the skin nozzles, depending on their position in the mold. In other words, where there are two adjacent nozzles, the skin nozzle (e.g. 3a) is activated before the core nozzle (e.g. 4b); where there are two different, non adjacent nozzles, the core nozzle (e.g. 4c) may be activated before the skin nozzle (e.g. 3b).

An example of a door panel co-injected according to the present invention is described.

EXAMPLE

A door panel similar in shape and nozzle-distribution to that shown in FIG. 2 and described above, was produced using a twin-injector press. The skin material was a thermoplastic elastomer TPO based, type VSR 561/2 (MFI=5 at 230° C. 2,16 kg-ASTM 1238L) produced by REAP (Milano-Italy) and the core was polypropylene filled with wood flour type CR (MFI=5 a 190° C.; 2,16 kg-ASTM 1238L) also produced by REAP. The skin to core ratio was about 50/50 (by weight) and the injection temperature was 220–230° C. for the skin and 190° C. for the core.

The injection times were controlled on the basis of the press screw travel to give the sequential injection described above. Retainers and studs were produced by using slide-valve techniques to obtain retaining elements that were comprised substantially of core material only. A door panel was produced with an external surface (skin) distributed evenly over the entire surface except for the injection points and the retaining brackets and pivots (retainers 13 and studs 13a). There were no junction lines on the skin.

The mechanisms described above can be used to produce a molded product with a structure similar to that shown in FIGS. 5 and 6. In both cases a slide-valve mechanism in combination with a group of nozzles according to the invention produced a moldings of the type shown. FIG. 5 shows three nozzles; the center nozzle 16 is dedicated to injecting only skin material A while the side injectors 17 are two-material co-injection type to feeding either A or B. Two slide-valve mechanisms or similar means of temporarily closing the portion 20 and 20a of the mold are in place at 18 and 19 and are activated before the injection of the material A from the nozzle 16. Material A fills the central portion of the mold completely and the side portion 20 and 20a partially. Next, the slider are removed and the material B is injected by nozzle 17.

The piece shown in FIG. 6 is obtained similarly. In FIG. 6 are shown two side injectors 17 to co-inject A and B, and the central nozzles 16 and 16' dedicated for the injection of A and B respectively.

What is claimed is:

1. A process of co-injection molding a multi-layer product having an external skin layer and an internal core layer, comprising injecting two or more materials from a plurality of distinct injection points for each of said two or more materials into a single mold cavity in a manner such that the product has a skin layer which substantially completely covers an internal core layer.

2. A process according to claim 1, wherein said two or more materials are independently of each other cascade injected.

3. A process according to claim 1, wherein the at least two material are injected substantially one after another.

4. A process according to claim 3, wherein a material injected first reaches a pre-selected location within the single mold cavity upon which a signal is generated which signal initiates the injecting of a second material.

5. A process according to claim 1 wherein at least one of the said at least two materials is prevented from flowing into a pre-selected area of the mold.

6. A multi-layer product comprising at least one external skin layer and an internal core layer wherein the external skin layer substantially completely covers the internal core layer obtained by the process according to claim 1.

7. A multi-layer product prepared by the process according to claim 1 comprising core material in one or more pre-selected areas.

8. A trim panel comprising an external skin layer, an internal core layer, and means of panel assembly comprising retainers and studs made of substantially core material only obtained by the process according to claim 1.

9. A process according to claim 1, wherein the materials are injected in such a manner that the external skin layer is sufficiently fluid at the time the material for the core layer is injected whereby such core material drives and distributes or pushes and distributes the said material which forms the skin layer.

10. A process of co-injection molding a trim panel for a motor-vehicle integral with retainers, studs, and/or other means of assembly, comprising injecting two or more materials one after another or substantially one after another from a plurality of distinct injection points for each of said two or more materials into a into a single mold cavity in a manner such that the product has a skin layer which substantially completely covers the internal core layer wherein the mold cavity comprises one or more pre-selected areas corresponding to where retainers, studs, and/or other means of assembly will be located on the trim panel, wherein the skin layer is prevented from flowing into said pre-selected areas.

11. A process according to claim 10, wherein the materials are injected in such a manner that the external skin layer is sufficiently fluid at the time the material for the core layer is injected that such core material spreads the said material which forms the skin layer.

* * * * *